(12) United States Patent
Hansell et al.

(10) Patent No.: US 6,606,858 B2
(45) Date of Patent: Aug. 19, 2003

(54) NEUTRAL OVERRIDE FOR SERVO CONTROLLED HYDROSTATIC UNITS

(75) Inventors: Jeffrey C. Hansell, Overbrook, KS (US); Richard J. Barrett, Ames, IA (US); Charles P. Heisig, New Holland, PA (US); Nianzhu Luo, Easley, SC (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/996,303

(22) Filed: Nov. 28, 2001

(65) Prior Publication Data

US 2002/0038547 A1 Apr. 4, 2002

Related U.S. Application Data

(63) Continuation of application No. 09/560,688, filed on Apr. 27, 2000.

(51) Int. Cl.[7] .............................................. F16D 31/02
(52) U.S. Cl. ........................................ 60/444; 60/468
(58) Field of Search .................... 60/444–468; 92/12.2; 251/118, 325, 129.8

(56) References Cited

U.S. PATENT DOCUMENTS

| | | | |
|---|---|---|---|
| 3,365,886 A | * | 1/1968 | Moon, Jr. ..................... 60/389 |
| 3,588,285 A | * | 6/1971 | Moon, Jr. ..................... 417/206 |
| 3,739,578 A | * | 6/1973 | Roeske ......................... 60/444 |
| 4,055,047 A | | 10/1977 | Hara |
| 4,417,649 A | | 11/1983 | Frost |
| 4,432,585 A | | 2/1984 | Nezuka |
| 4,457,341 A | * | 7/1984 | Aspinwall .................... 251/325 |
| 4,461,147 A | | 7/1984 | Myers |
| 4,588,057 A | | 5/1986 | Weich et al. |
| 4,596,118 A | | 6/1986 | Heiser |
| 5,050,700 A | | 9/1991 | Kim |
| 5,531,071 A | | 7/1996 | Asano |

FOREIGN PATENT DOCUMENTS

| | | |
|---|---|---|
| DE | 22 64 442 | 2/1974 |
| DE | 27 59 197 | 7/1979 |
| EP | 0 127 123 | 12/1984 |

* cited by examiner

Primary Examiner—Edward K. Look
Assistant Examiner—Igor Kershteyn

(57) ABSTRACT

The neutral override circuit of this invention includes a variable displacement pump controlled by a servo fluidly connected to a displacement control that is biased to a neutral position. A charge pump is connected to the pump and the displacement control. A solenoid-operated neutral override brake control valve is connected to the charge circuit upstream of the displacement control valve and is normally biased to an open position. However, the solenoid urges the valve to a closed position in a response to a signal indicating that the brake has been released. In the open position, the valve dumps charge flow to the pump case until the supply pressure to the displacement control is inadequate to overcome the centering bias of the displacement control. The characteristics of the brake control valve can be set so that some minimum charge pressure and lubricating flow are still provided to the rotating elements of the pump.

10 Claims, 5 Drawing Sheets

NEUTRAL OVERRIDE FOR SERVO CONTROLLED HYDROSTATIC UNITS

BACKGROUND OF THE INVENTION

The present invention relates to the field of hydrostatic units used to propel vehicles. More particularly, this invention relates to a neutral override circuit or system for servo controlled hydrostatic units.

A skid steer loader is one type of vehicle that often utilizes one or more hydrostatic transmissions for propulsion. Typically, the vehicle's engine drives a servo-controlled variable displacement hydraulic pump that fluidly drives a hydraulic motor. The hydraulic motor powers one or more of the vehicle wheels.

Some skid steer loader manufacturers have added service and/or parking brakes to their hydrostatically propelled machines to prevent them from rolling away or being moved inadvertently (inadvertent movement can sometimes occur if the pump of the hydrostatic transmission is accidentally stroked out of its neutral position). In fact, new regulatory requirements are demanding parking brakes on skid steer loaders bound for European markets. Current methods of providing braking systems require the brake to absorb the full torque capability of the hydrostatic transmission. Current braking systems are hard pressed to handle increasing hydrostatic torque capability and machine weight.

One approach to resolving this problem has been to isolate and reduce only the source pressure for the displacement control of the pump. However, this approach requires additional machined passages and valving to separate the control portion of the circuit from the supercharge portion of the circuit.

Therefore, a primary objective of the present invention is a provision of simple neutral override system or circuit that prevents the hydrostatic pump from stroking out of neutral.

Another objective of the present invention is the provision of a neutral override circuit that prevents the hydrostatic transmission from stroking out of neutral yet provides enough charge pressure to lubricate the rotating elements of the pump.

Another objective of the present invention is the provision of a neutral override system that is easy to retrofit to existing hydrostatic transmissions.

Another objective of the present invention is the provision of a neutral override system that is economical to manufacture, as well as durable and reliable in use.

These and other objectives will be apparent from the drawings, as well as from the description and claims which follow.

SUMMARY OF THE INVENTION

The present invention relates to the field of hydrostatic units used to propel vehicles. More particularly, this invention relates to a neutral override brake control valve and circuit or system for servo controlled hydrostatic units.

The neutral override circuit of this invention includes a variable displacement pump controlled by a servo fluidly connected to a displacement control valve. The displacement control valve is biased to a neutral position. A charge pump is connected to the pump and the displacement control. A solenoid-operated neutral override brake control valve is connected to the charge circuit upstream of the displacement control valve.

The brake control valve is normally biased to an open position. However, the solenoid urges the brake control valve to a closed position in a response to a signal indicating that the parking brake has been released. In the open position, the neutral override brake control valve dumps the charge flow to the pump case until the charge pressure is inadequate to overcome the centering bias of the displacement control. However, characteristics of the valve can be set so that some minimal charge pressure and lubricating flow are still provided to the rotating elements of the pump.

DETAILED DESCRIPTION OF THE PREFERRED EMBODIMENT

Figure 1:
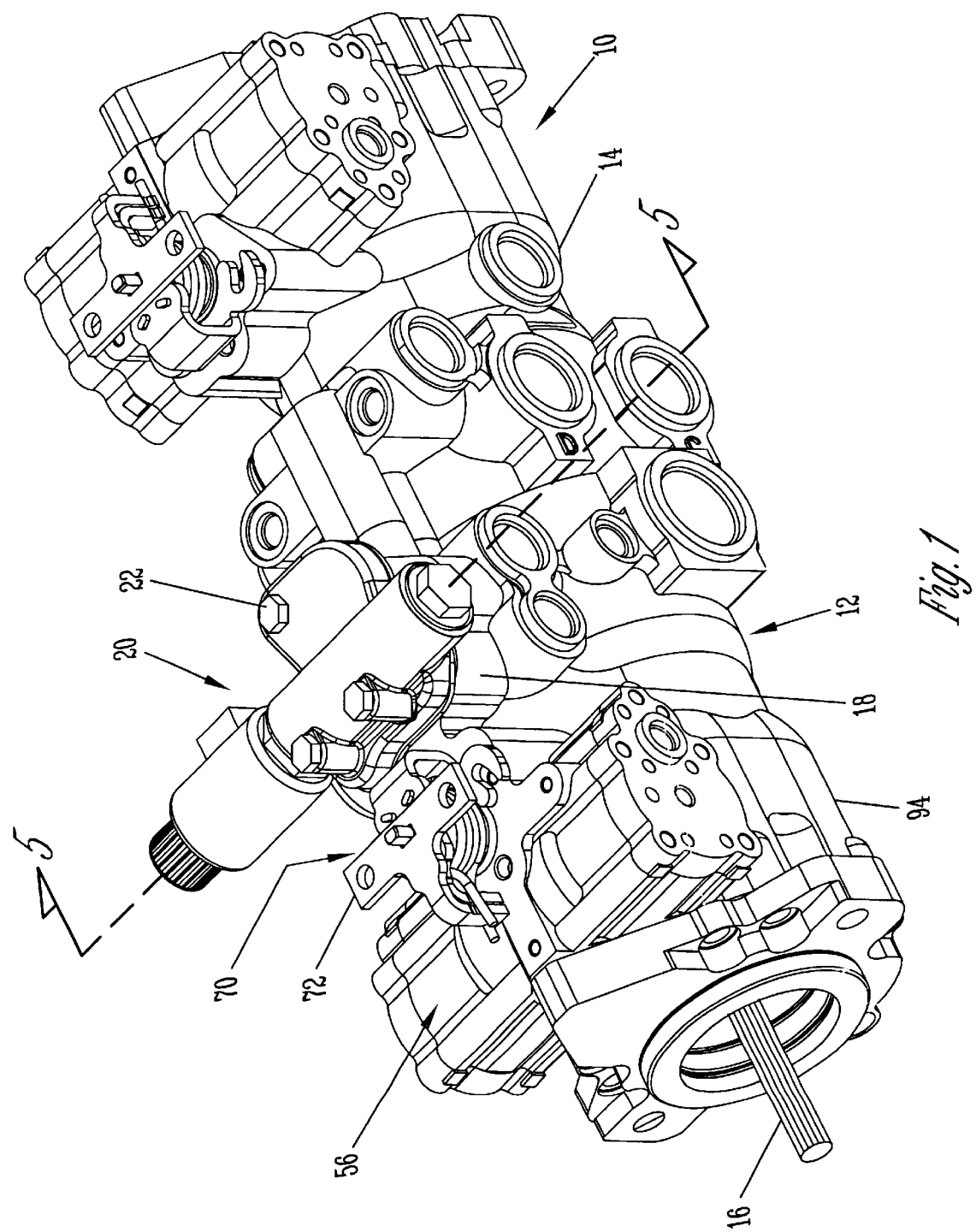
FIG. 1 is a perspective view of a servo controlled hydrostatic pump equipped with the neutral override brake control valve of the present invention.

A multiple pump hydraulic unit 10 is shown in FIG. 1. More particularly, the multiple pump unit 10 is a tandem pump that includes a front pump 12 and a rear pump 14 drivingly coupled together. The tandem pump 10 has an input shaft 16 that is driven in a conventional manner by the vehicle's engine (not shown). The front pump 12 of the tandem pump 10 has a pressure filtration mounting pad 18 thereon. The neutral override brake control valve 20 of this invention mounts to the mounting pad 18 with conventional threaded fasteners 22.

Figure 3:
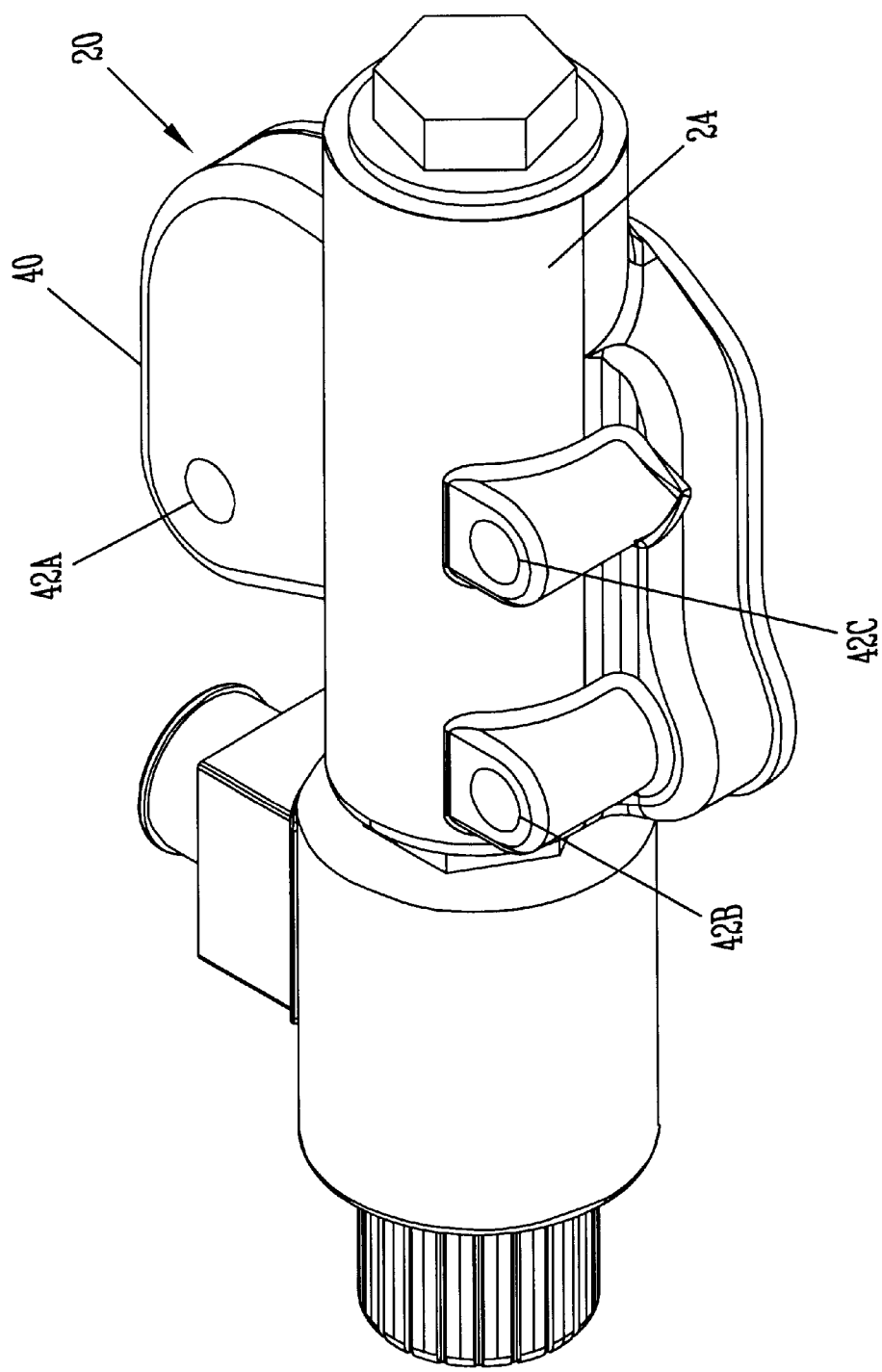
FIG. 3 is a perspective view of the neutral override (NOR) brake control valve of the present invention.
Figure 4:
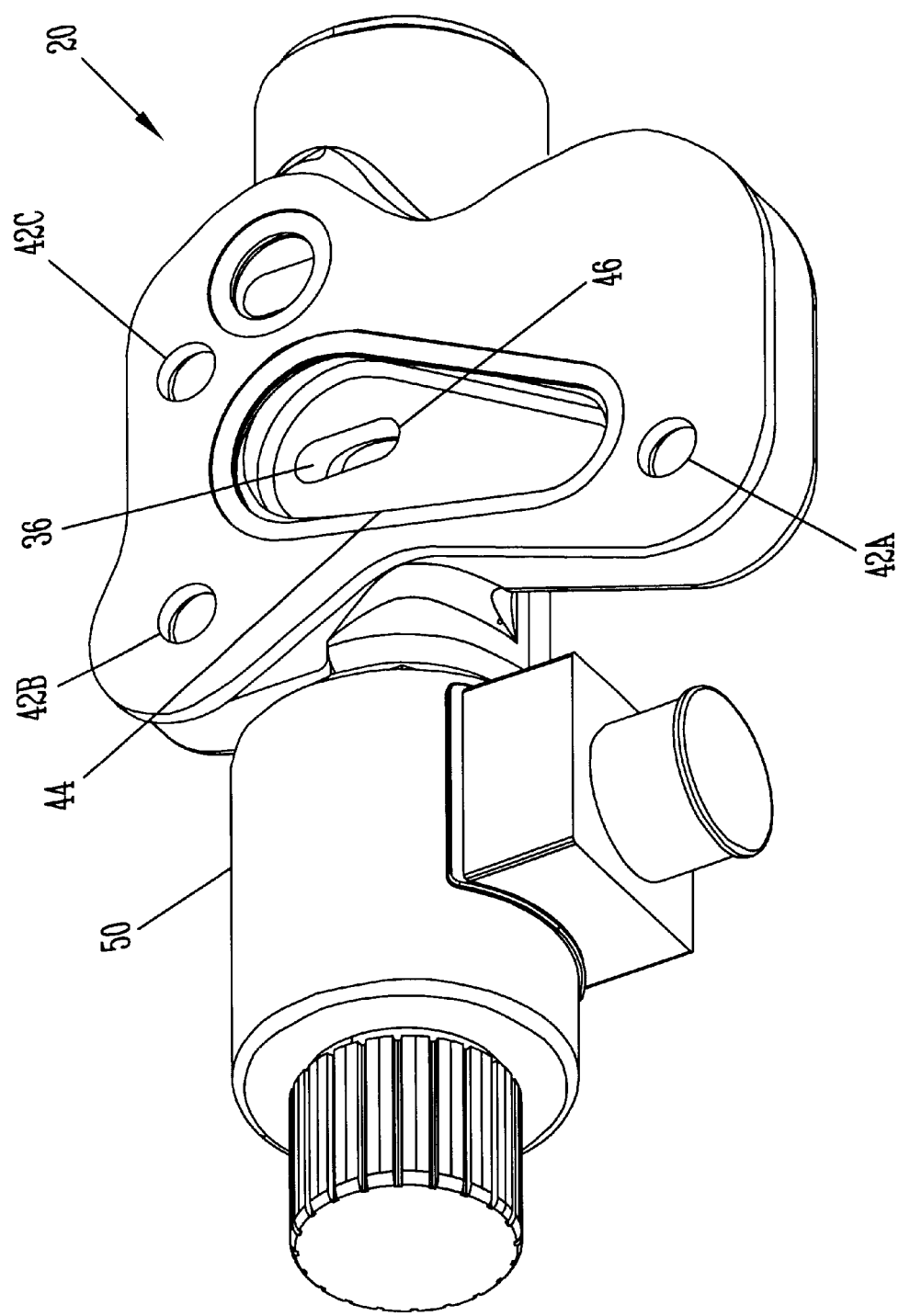
FIG. 4 is a perspective view of the bottom of the NOR valve of this invention.
Figure 5:
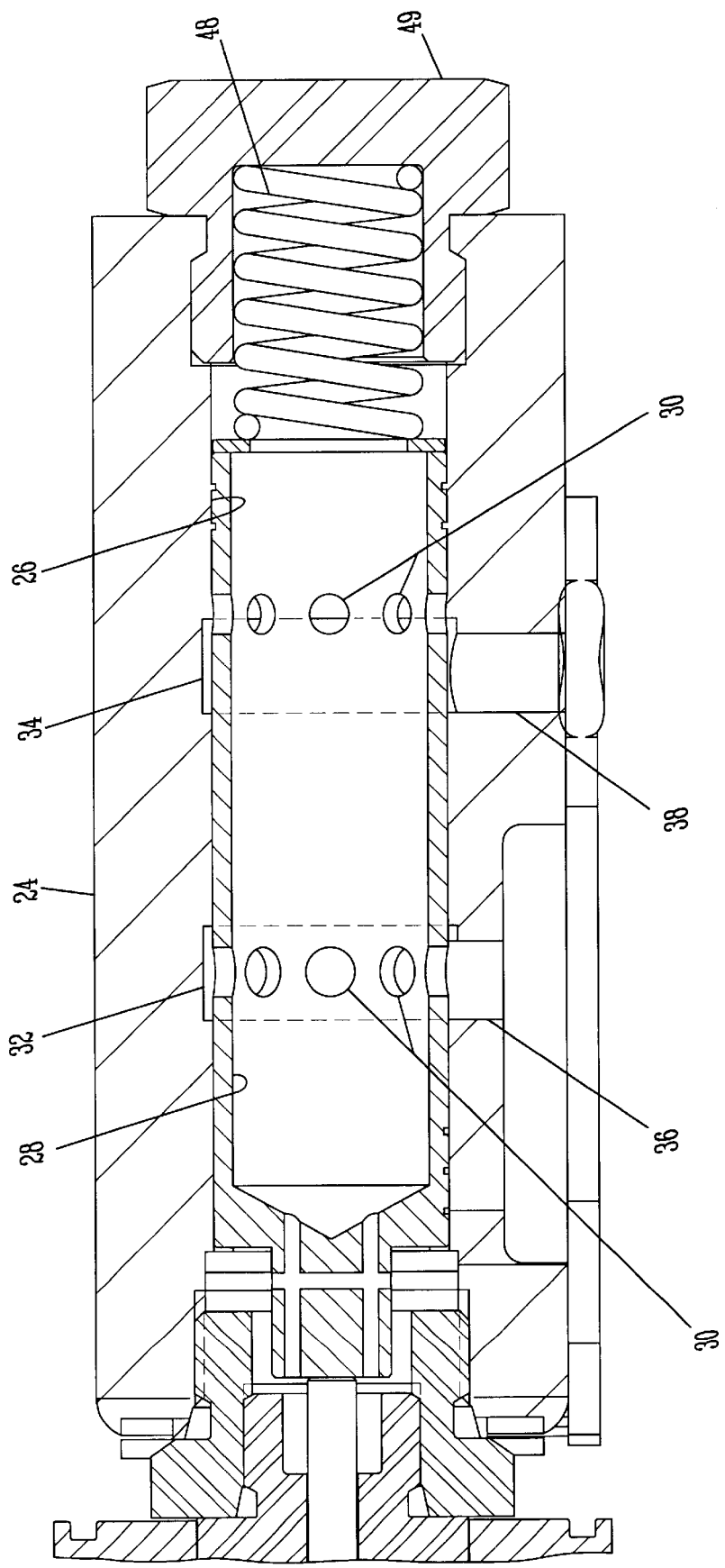
FIG. 5 is a sectional view of the NOR valve of this invention taken along line 5—5 in FIG. 1.

Referring to FIGS. 3–5, the neutral override brake control valve 20 is a two-position solenoid-operated proportional spool valve. The valve 20 has a housing 24 with an elongated bore 26 therein. An elongated hollow spool 28 mounts in the bore 26. The spool 28 has a porting groove, notches, or holes 30 formed therein. The bore 26 includes a pair of longitudinally spaced annuli 32, 34. The annuli 32, 34 are fluidly connected to the rest of the pump circuit by supply passage 36 and a drain passage 38 respectively. Depending on the axial position of the spool 28, the holes 30 are selectively simultaneously aligned with the annuli 32 and 34 to allow fluid to flow through the valve 20. The housing 24 has a flange 40 thereon that mates with the pressure filtration mounting pad 18. A plurality of holes 42A, 42B, 42C enabled the valve 20 to be mounted to the pump 12 with conventional fasteners 22. The underside of the flange 40 has a cavity 44 formed around the supply passage 36. A supply orifice 46 creates a pressure drop just above the valve 20 to ensure proper flow to the valve 20. Preferably, the orifice 46 is a fixed orifice. Referring to FIG. 5, the area of the porting holes 30 can also be selected so as to effectively create a drain orifice that is integral with the spool 28. If the effective flow area provided by the drain passage 38 is smaller than the area of the porting holes 30, the drain passage 38 itself can constitute a fixed drain orifice.

Figure 2:
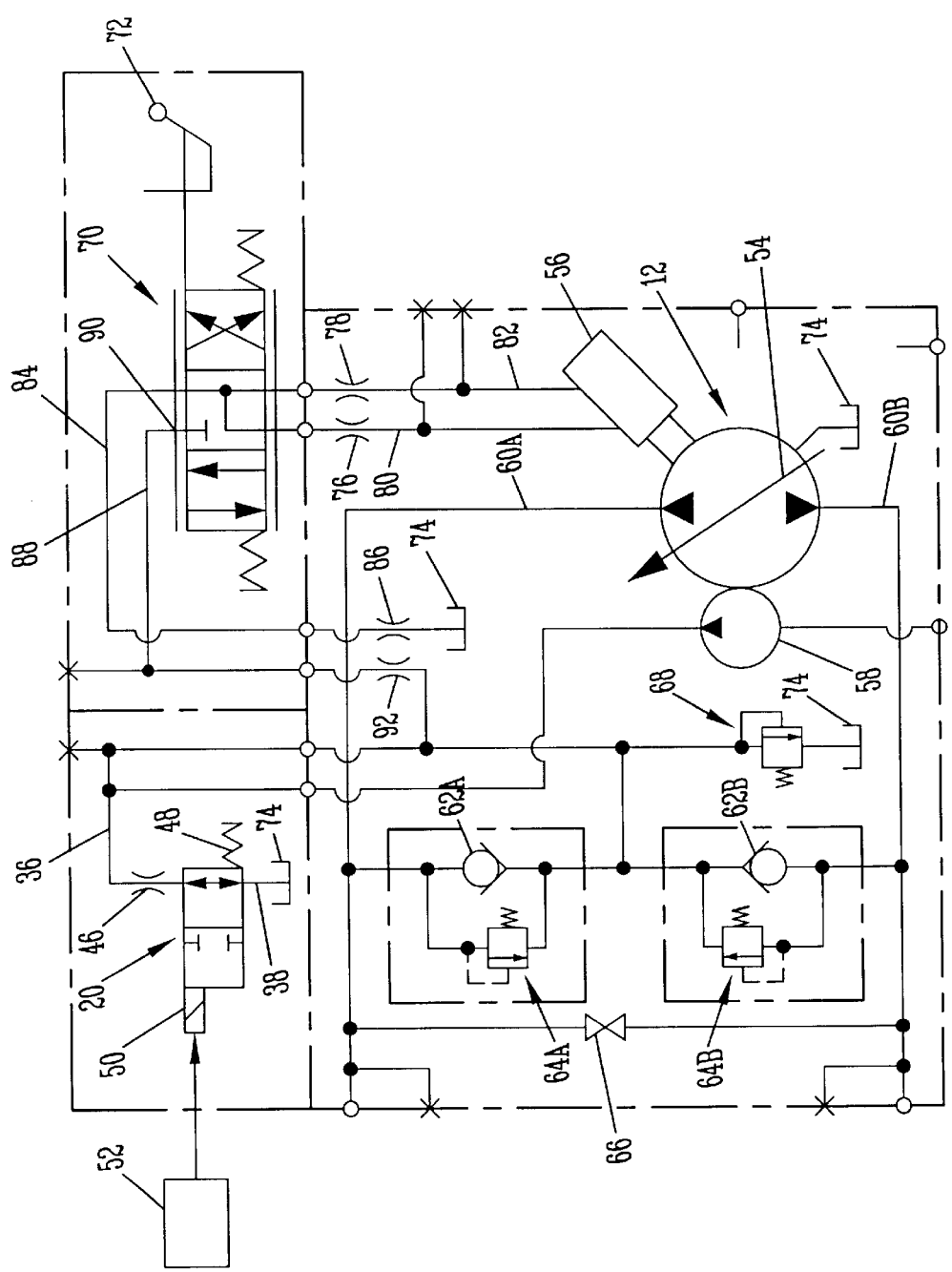
FIG. 2 is a schematic diagram showing a hydraulic pump circuit with the neutral override brake control valve of the present invention incorporated therein.

A biasing means, such as a spring 48, yeildably urges or biases the spool 28 to the left as shown in FIGS. 2 and 5. A solenoid 50 is electrically connected to the brake circuit 52 of the vehicle and operatively engages the end of the spool 28 opposite the spring 48.

FIG. 2 shows a hydrostatic circuit that incorporates the neutral override brake control valve 20. For purposes of illustration, the circuit depicts the valve 20 being operatively connected to the first pump 12, but the valve 20 could be connected to the rear pump 14 instead. Of course, the most logical place for the valve 20 is within a pump circuit that propels the vehicle. The pump 12 is a variable displacement hydraulic pump that has a swashplate 54 or similar moveable member controlled by a servo 56. The position of the swashplate 54 establishes the displacement of the variable displacement pump 12.

A super-charging or charge pump 58 is operatively connected to the pump 12 and is driven by the engine as well. The charge pump 58 provides a source of pressurized fluid for control functions, charging the pump 12, and replenishing fluid losses. In order to replenish the fluid losses, fluid is drawn from a reservoir (not shown) and delivered to whichever of the system pressure lines 60A, 60B has the lowest pressure. Conventional check valves 62A, 62B, high pressure relief valves 64A, 64B, a by-pass valve 66, and a charge pressure relief valve 68 are placed in the circuit as shown.

The pressurized fluid from the charge pump 58 is also used for controlling the displacement of the variable displacement pump 12 through a displacement control valve 70. The charge pressure relief valve 68 resides downstream of the charge pump 58, but upstream from the displacement control valve 70, the neutral override brake control valve 20, and the charging portion of the circuit. The displacement control valve 70 is preferably a linearly actuated, spring-centered, three-position, four-port spool valve. However, the valve 70 could be a rotary spool valve without detracting from the invention. An operator input device 72 connects to the valve 70 and is movable with conventional linkage (not shown) attached to a foot pedal, hand lever, or the like.

Orifices 76, 78 are included in the fluid passages 80, 82, respectively, that connect the displacement control valve 70 to the servo 56. A drain line 84 connects the displacement control valve 70 with the pump case 74. The drain line 84 includes an orifice 86 therein.

A supply line 88 supplies charge pressure to the displacement control valve 70. The supply line 88 includes a orifice 92 therein. The supply line 88 creates an inlet port 90 at the displacement control valve 70. Preferably orifices 76, 78, 86, and 92 are fixed orifices. In either of the end positions of the displacement control valve 70, one side of the servo 56 pressurizes while the other side of the servo 56 drains to the pump case 74. The only difference is the direction in which the servo 56 moves the swashplate 54, and the resulting directional flow of fluid in the system pressure lines 60A, 60B. Generally, one of the end positions of the displacement control valve 70 corresponds to a forward direction of movement for the vehicle and the other end position of the valve 70 corresponds to a reverse direction of movement for the vehicle. In the spring-centered neutral (center) position of the displacement control 70, the supply inlet port 90 is blocked off and both sides of the servo 56 are connected to the pump case 74 by the drain line 84.

The neutral override brake control valve 20 connects to the charge pressure supply line 88 upstream of the displacement control valve 70. Preferably the brake control valve 20 is downstream of the charge relief valve 68.

In operation, the neutral override brake control valve 20 ensures that displacement control 70 cannot inadvertently stroke the pump 12 out of neutral when the brakes of the vehicle are set. When a threshold current is supplied by the brake circuit 52, indicating that the vehicle's brakes have been released, the solenoid 50 urges the spool 28 to the right to overcome the biasing force of the spring 48 and close the valve 20. The neutral override brake control valve 20 does not interfere with the normal operation of the pump 12 when the brakes have been released. In other words, the brake control valve 20 basically has two positions: 1) A closed first position, and 2) an open second position. In the closed first position, charge flow is blocked. In the open second position, a significant portion of the charge flow is diverted to the pump case 74 so as to ensure that pressure downstream of the brake control valve 20 is always insufficient to overcome the centering springs of the displacement control 70, whether the displacement control 70 is in a neutral or non-neutral position. Even if the operator input device 72 is inadvertently stroked out of a neutral position once the brakes have been applied, the vehicle will not roll away.

The solenoid-operated brake control valve 20 is designed to work properly even if there is an electrical failure. The valve 20 automatically opens in the event of an electrical failure. Then the pump 12 returns to a neutral position or zero displacement.

The spring 48 of the neutral override brake control valve 20 and the holes 30 in the valve spool 28 can be selected so as to establish a predetermined pressure downstream of the brake control valve 20 that is insufficient to overcome the neutral biasing force of the control valve springs, yet sufficient to provide adequate lubrication for the rotating elements of the pump 12. In one preferred embodiment of this invention, the charge pressure relief valve 68 is set at approximately 200 pounds per square inch (psi) and the spring 48 and the drain orifice 46 associated with the brake control valve 20 are sized so as to maintain a maximum of approximately 75 psi charge control pressure when the brake control valve 20 is opened and dumping fluid to the pump case 74. The resulting 75 psi charge pressure is sufficient to provide adequate lubrication for the rotating elements of the pump 12, but will not overcome the centering spring of the displacement control valve 70 (approximately 85–100 psi is generally required for this).

The brake control valve 20 of this invention is easily retrofitable on existing pumps 12 which have a remote pressure filtration pad 18 on the housing or casing 94. However, the brake control valve 20 of this invention could also be remotely mounted by using external hoses.

Thus, it can be seen that the present invention at least satisfies its stated objectives.

What is claimed is:

1. A neutral override circuit for a hydrostatic pump, comprising:
    a variable displacement pump having a casing and being controlled by a displacement control comprising a displacement control valve and a servo;
    the displacement control valve being fluidly connected to the servo and being biased to a neutral position that generally corresponds to a neutral position of the displacement control;
    a source of pressurized fluid for charging the pump, the source being operatively connected to the pump and the displacement control;
    a solenoid-operated neutral override brake control valve having first and second ports, the first port being fluidly connected with a case drain and the second port being fluidly connected to the source of charge pressure, the solenoid-operated valve including a first position in which the first port and the second port are blocked and thereby the solenoid-operated valve including a second position in which the first port and the second port are interconnected through an internal passageway in the solenoid-operated valve such that the solenoid-operated valve is opened and flow from the source of charge pressure is dumped into the casing to reduce the charge pressure to a predetermined value that is less than a neutral biasing force on the displacement control so that the displacement control remains in the neutral position thereof;

the solenoid-operated valve being located downstream from the source of charge pressure and upstream from the displacement control valve;

a brake circuit for generating an electrical signal that indicates that a brake has been released;

the solenoid-operated valve having a solenoid connected thereto and being normally open in the absence of a current being supplied to the solenoid from the brake circuit, the current signaling the release of the brake.

2. The circuit of claim 1 wherein the pump has a casing and the solenoid-operated valve is mounted on a pressure filtration pad formed on the casing.

3. The circuit of claim 1 comprising a charge pressure relief valve located upstream of the solenoid-operated valve.

4. The circuit of claim 1 wherein the solenoid-operated valve has an orifice operatively associated therewith for reducing the charge pressure available to the displacement control valve to the predetermined value.

5. The circuit of claim 4 wherein the orifice is fixed and is defined by a fluid passageway within the solenoid-operated valve having a reduced cross sectional area.

6. The circuit of claim 1 wherein the solenoid-operated valve is a linearly movable proportional spool valve.

7. The circuit of claim 6 wherein the solenoid-operated valve includes a housing and an elongated spool slidably mounted in the bore, the spool being biased toward the open position of the valve by a spring that operatively engages the spool.

8. The circuit of claim 7 wherein the bore has a pair of axially spaced annuli extending outwardly therefrom and the spool of the solenoid-operated valve is a hollow tubular member having an interior surface and an exterior surface, a plurality of longitudinally spaced porting holes extending from the exterior surface through the interior surface to define a portion of the internal passageway in the solenoid-operated valve when the holes are registered with the annuli.

9. A neutral override system for a hydrostatically propelled vehicle having a brake, the system comprising:

a variable displacement pump having a casing and being controlled by a displacement control comprising a displacement control valve and a servo;

the displacement control valve being a three position spring centered neutral biased displacement control valve for supplying control pressure to the servo, the displacement control valve being operatively connected to the servo and having a forward position, a reverse position, and a neutral position that generally corresponds to a neutral position of the displacement control;

a source of pressurized fluid for charging the pump and supplying fluid to the displacement control valve, the source of charge pressure being operatively connected to the pump and the displacement control valve;

a brake control valve having first and second ports, the first port being fluidly connected with the casing and the second port being fluidly connected to the source of charge pressure, the brake control valve including a first position in which the first port and the second port are blocked and thereby the brake control valve is closed, the brake control valve including a second position in which the first port and the second port are interconnected through an internal passageway in the brake control valve such that the brake control valve is opened and flow from the source of charge pressure is dumped to the casing to reduce the charge pressure to a predetermined value that is less than a neutral biasing force of the displacement control so that displacement control remains in the neutral position thereof;

a brake circuit for generating an electrical signal that indicates that the brake has been released;

a solenoid for moving the brake control valve from the open second position to the closed first position in response to said electrical signal from the brake circuit;

the brake control valve being located downstream from the source of charge pressure and upstream from the displacement control valve;

the solenoid-operated brake valve being a two position two port valve.

10. The system of claim 9 wherein the displacement control valve is a three position four port spool valve that is spring centered to a central position which corresponds to the neutral position.

* * * * *